(12) United States Patent
Chan et al.

(10) Patent No.: US 10,139,520 B2
(45) Date of Patent: Nov. 27, 2018

(54) METHOD OF USING A HEAT-TREATED TITANIUM NITRIDE FILM

(71) Applicant: CPFilms Inc., Fieldale, VA (US)

(72) Inventors: Kin Sheng Ken Chan, Singapore (SG); Peng Jun Albert Wang, Suzhou (CN)

(73) Assignee: CPFilms Inc., Fieldale, VA (US)

( * ) Notice: Subject to any disclaimer, the term of this patent is extended or adjusted under 35 U.S.C. 154(b) by 309 days.

(21) Appl. No.: 14/988,784

(22) Filed: Jan. 6, 2016

(65) Prior Publication Data

US 2016/0223713 A1 Aug. 4, 2016

Related U.S. Application Data

(60) Provisional application No. 62/109,705, filed on Jan. 30, 2015.

(51) Int. Cl.
| | |
|---|---|
| *B32B 17/06* | (2006.01) |
| *G02B 1/12* | (2006.01) |
| *G02B 5/12* | (2006.01) |
| *G02B 1/04* | (2006.01) |
| *B05D 3/00* | (2006.01) |
| *G02B 5/20* | (2006.01) |
| *B32B 17/10* | (2006.01) |
| *B32B 7/02* | (2006.01) |
| *B32B 7/06* | (2006.01) |
| *B32B 7/12* | (2006.01) |
| *B32B 27/36* | (2006.01) |

(52) U.S. Cl.
CPC .............. *G02B 1/04* (2013.01); *B05D 3/007* (2013.01); *B32B 7/02* (2013.01); *B32B 7/06* (2013.01); *B32B 7/12* (2013.01); *B32B 17/064* (2013.01); *B32B 17/10174* (2013.01); *B32B 27/36* (2013.01); *G02B 1/12* (2013.01); *G02B 5/208* (2013.01); *B32B 2255/10* (2013.01); *B32B 2255/205* (2013.01); *B32B 2307/412* (2013.01); *B32B 2309/02* (2013.01); *B32B 2311/18* (2013.01); *B32B 2367/00* (2013.01); *B32B 2405/00* (2013.01); *B32B 2419/00* (2013.01); *B32B 2605/00* (2013.01)

(58) Field of Classification Search
None
See application file for complete search history.

(56) References Cited

U.S. PATENT DOCUMENTS

| 4,535,000 A | 8/1985 | Gordon |
|---|---|---|
| 5,202,152 A | 4/1993 | Giannelis et al. |
| | (Continued) | |

FOREIGN PATENT DOCUMENTS

WO WO 2008/036358 A2 3/2008

*Primary Examiner* — Barbara J Musser
(74) *Attorney, Agent, or Firm* — Michael Carrier

(57) ABSTRACT

A heat-treated titanium nitride film including a polymeric substrate and at least one titanium nitride layer is disclosed. The titanium nitride layer of the film is characterized by microscopic uniform generally parallel surface cracking in the machine direction of the film. The film is particularly useful as a solar control film suitable for application to a contoured transparent substrate with reduced or eliminated ghosting. A method for treating a titanium nitride film prior to application to a transparent contoured substrate and a method for applying a titanium nitride film to a transparent contoured substrate are also described.

9 Claims, 2 Drawing Sheets

(56) References Cited

U.S. PATENT DOCUMENTS

| | | |
|---|---|---|
| 5,227,334 A | 7/1993 | Sandhu |
| 5,294,272 A | 3/1994 | Peterson et al. |
| 6,188,512 B1 | 2/2001 | Woodard et al. |
| 6,304,720 B1 | 10/2001 | Richard |
| 6,797,396 B1 | 9/2004 | Liu et al. |
| 8,404,303 B2 | 3/2013 | Khee et al. |
| 2003/0047280 A1* | 3/2003 | Takayama ............... B32B 7/06 156/708 |
| 2007/0196630 A1* | 8/2007 | Hayes ..................... B32B 17/10 428/195.1 |
| 2009/0133820 A1* | 5/2009 | Sato ....................... B08B 7/0057 156/247 |
| 2010/0015431 A1* | 1/2010 | Matsui .............. B29C 66/72324 428/323 |

* cited by examiner

METHOD OF USING A HEAT-TREATED TITANIUM NITRIDE FILM

CROSS REFERENCE TO RELATED APPLICATIONS

This application claims the benefit of U.S. Provisional Application Ser. No. 62/109,705, filed Jan. 30, 2015, the disclosure of which is incorporated herein by reference in its entirety.

FIELD OF THE INVENTION

The present invention broadly relates to titanium nitride films, more particularly titanium nitride films for use primarily in automotive and architectural window film applications and methods for their manufacture.

BACKGROUND OF THE INVENTION

Conventional processes for installation of window film on curved window surfaces such as windscreens typically involve a step of applying heat to a precut piece of film (known as a blank) using a heat gun or similar device. to shape the film blank to match the curvature of the window before it is applied to and installed on the window. For example, U.S. Pat. No. 6,304,720 generally describes processes for installing window film on automotive glass with compound curves wherein the film is heat-formed on the exterior surface of the glass so as to smoothly lay on the compound curvature to be subsequently adhesively applied to the inside surface. Similarly, U.S. Pat. No. 5,294,272 describes a method for applying a film to a surface of a contoured car window wherein the film is positioned on the outer surface of the window and subjected to localized heating to selectively shrink the film to match the window contour prior to installation of the film using an adhesive.

As further described in U.S. Pat. No. 6,304,720, the details of the heat-forming step typically involve the installer moving the heating device around and over the film surface at manually controlled distances and times, attempting to apply heat in an amount just sufficient to allow the film to form to the curved shape section by section in stepwise fashion without damaging the film. This aspect of the installation technique requires a substantial learning curve that is traversed mostly through trial and error, often resulting in substantial film damage and waste.

Films with ceramic layers, in particular solar control window films with titanium nitride layers such as for example those films sold by Eastman Chemical Company under the trademark Hüper Optik® and described in U.S. Pat. Nos. 6,188,512 and 8,404,303, the disclosures of which are incorporated herein by reference, can be particularly sensitive to negative impact from this heat-forming step. Even with proper heat-forming technique, ceramic layer-containing films and titanium nitride layer-containing films in particular have been known to exhibit a tendency to "ghost" or "whitewash" whereby a light, whitish haze would develop over certain random portions of the film during the heat-forming step in the installation process. "Ghosting" occurs when the titanium nitride layer or layers of the film construction crack during the heat-forming step and is believed to be caused by thermal stresses that develop from uneven shrinkage of the various materials in the different film construction layers. Though ghosting does not impact the solar control and heat rejection performance of the film when employed for these purposes, it is a cosmetic defect that is visible at certain angles and is therefore undesirable.

To date, installers have found (with limited success) that ghosting may be reduced through use of relatively lower heat-forming temperatures (e.g. 260° C. to 350° C.) and carefully controlled heat application variables such as heat gun distance, angle, motion, blower speed, diffusion and sequential zone treatment to effect the heat-forming step. Unfortunately, control of these processing conditions is highly dependent on installer skill level and equipment sophistication and may be beyond the capabilities of many window film installation service providers and shops. Further, ghosting has been found to occur even under processing conditions which are closely monitored and controlled.

A continuing need therefore exists in the art for a titanium nitride film that may be easily and effectively installed on contoured window surfaces using a wide variety of heat-forming conditions with minimal risk of ghosting or other negative effects from the installation process. A related need in the art is for a titanium nitride film installation method that minimizes if not eliminates the risk of ghosting and other negative effects when the film is applied to a contoured substrate.

SUMMARY OF THE INVENTION

The present invention addresses this continuing need and achieves other good and useful benefits by providing a heat-treated titanium nitride film suitable as a solar control film for application to a contoured transparent substrate. The film includes a polymeric substrate and at least one titanium nitride layer characterized by microscopic uniform generally parallel surface cracking in the machine direction of the film.

The present invention further provides a method for treating a titanium nitride film prior to application to a transparent contoured substrate. The method includes heating the film in a substantially uniform temperature environment and then removing the film from that environment.

The present invention also includes method for applying a titanium nitride film to a transparent contoured substrate. This method includes uniformly heating the titanium nitride film to form a uniformly heat-treated titanium nitride film; and heat-forming the titanium nitride film with step-wise heat application to match the contour of the transparent contoured substrate.

Further aspects of the invention are as disclosed and claimed herein.

BRIEF DESCRIPTION OF THE DRAWINGS

The invention will be described in further detail below and with reference to the accompanying drawings, wherein like reference numerals throughout the figures denote like elements and in wherein.

DETAILED DESCRIPTION

Figure 1:
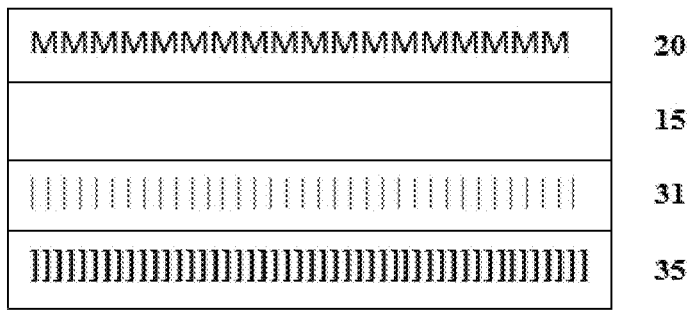
FIG. 1 is a schematic cross-section of the primary components of an embodiment of the titanium nitride film of the present invention with a single titanium nitride layer.

As shown in FIG. 1, in one aspect the present invention is generally directed to a heat-treated titanium nitride film 10 that includes a polymeric substrate 15 and at least one titanium nitride layer 20. The polymeric substrate 15 is preferably a flexible film formed from a thermoplastic such as a polyester and more preferably polyethylene terephthalate (PET). Suitable PET films are commercially available, for example from DuPont Teijin Films under the names Melinex 454 or LJX 112. Other suitable thermoplastics for forming the polymeric substrate 15 include, for example, polyacrylic, polyimides, polyamides such as nylons and polyolefins such as polyethylenes, polypropylenes and the like. The polymeric substrate may include conventional additives such as UV-absorbers, stabilizers, fillers, lubricants and the like, blended therein or coated thereon. Preferably, the polymeric substrate is transparent, which generally connotes the ability to perceive visually an object, indicia, words or the like therethrough, A particularly suitable polymeric substrate is a flexible transparent polyethylene terephthalate (PET) film of a thickness of between 1.0 and 1.5 mil.

Figure 2:
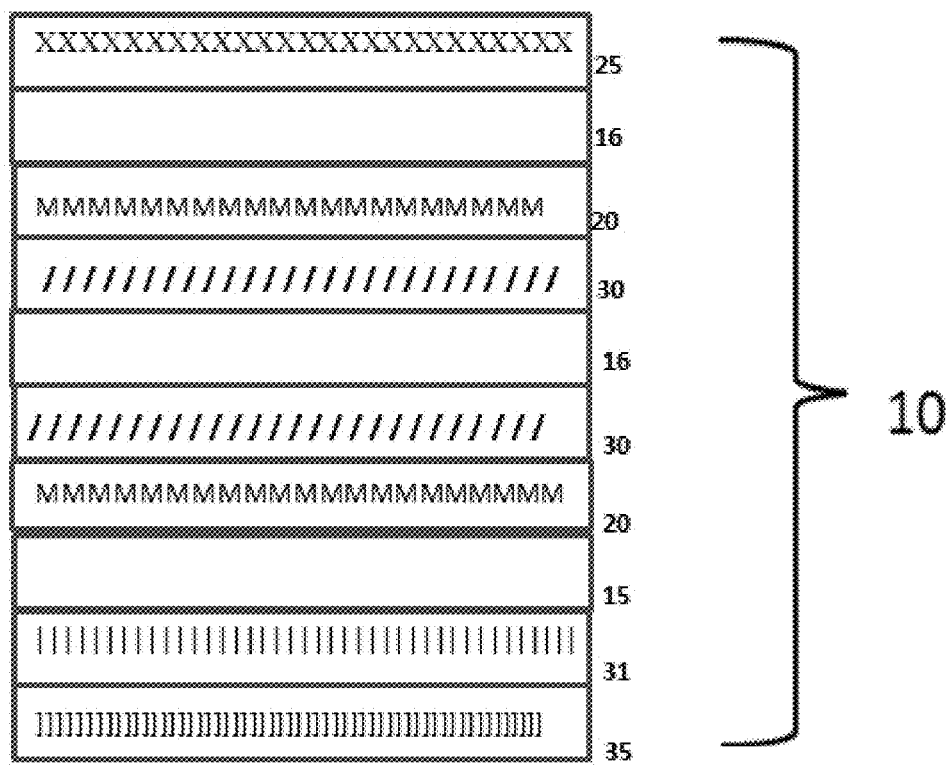
FIG. 2 is a schematic cross-section of an embodiment of the titanium nitride film of the present invention with two titanium nitride layers.

The titanium nitride layer 20 is preferably a solar control titanium nitride layer and the titanium nitride film of the present invention is accordingly preferably a solar control film. The phrase "solar control" is used to indicate that the film is useful when applied to transparent substrates such as a vehicle or building window to reduce the radiative heating through that window by selective reflection, absorption and/or transmission of electromagnetic energy. Solar control films with titanium nitride layers are known in the art and are described for example in the previously referenced '612 patent. In a specific embodiment, the solar control film is a solar control window film and the contoured transparent substrate is a window. Such titanium nitride solar control window films may optionally include layers known to those of ordinary skill in the window film art. More specifically, and as illustrated in FIGS. 1 and 2, the heat treated titanium nitride film 10 may also include for example protective hardcoats, scratch-resist or "SR" coats 25, laminating adhesive layers 30, mounting adhesive layers 31, protective release liners 35, support layers 16 (which may include multilayer laminates) and the like.

While the film of the present invention is shown in FIG. 1 with a single titanium nitride layer, it should be understood by one of ordinary skill that multiple titanium nitride layers may be utilized and are contemplated as within the scope of the invention. For example, the film depicted in FIG. 2 includes two titanium nitride layers 20 and 20'. A particularly useful titanium nitride film that includes dual titanium nitride layers is described in the previously referenced '512 patent. Further, films with a spectral filter are contemplated as within the scope of the present invention. A spectral filter typically includes a combination or series of spectral functionally layers, also known in the art as a "stack", with alternating relatively higher and lower refractive indices and designed to facilitate transmission of energy in certain electromagnetic wave frequencies and reflection in others, for example, an IR-reflecting filter that that also exhibits high visible transmittance as can desirable for thermal management window films. At least some layers in these known "stack" constructions may be titanium nitride layers.

The heat-treated titanium nitride films of the present invention are characterized by certain physical and chemical parameters. More particularly, the titanium nitride films of the present invention include a polymeric substrate and at least one titanium nitride layer characterized by microscopic uniform generally parallel surface cracking in the machine direction of said film. The "machine" direction of the film is defined as the direction that film is pulled and/or stretched through processing rollers during the manufacturing process thereby imparting a level of longitudinal molecular orientation of the film's polymer. This attribute can be most effectively imparted to titanium nitride films through a uniform heat-treatment as described herein and accordingly, the films of the present invention are termed heat-treated titanium nitride films or uniformly heat-treated titanium nitride films.

In one embodiment, the heat-treated titanium nitride films of the present invention are in the form a film blank. As used herein the phrase "film blank" means a portion of uncontoured film cut to a specified shape corresponding to a certain contoured transparent substrate for installation thereon. A film blank may be formed using manual measuring and cutting techniques and tools or may be formed using more sophisticated systems for cutting the blanks from computer-stored digital patterns imaged to match and follow the outer edge and shape of specific contoured transparent substrates, for example windows or windscreens from individual car makes, models and model years.

In another aspect, the present invention is directed to a method for treating a titanium nitride film prior to application to a transparent contoured substrate. The present method includes heating the titanium nitride film in a substantially uniform temperature environment for a specified period and at a specified temperature to provide a uniformly heat-treated titanium nitride film and then removing the heat-treated titanium nitride film from the substantially uniform temperature environment. As used herein the phrase "substantially uniform temperature environment" means that the temperature in the environment is approximately equivalent throughout the environment at a given time. Most preferably the temperature of the substantially uniform temperature environment for the heating step is substantially constant over the time period for the heating step. The uniformly heat-treated titanium nitride film of the present method is the heat-treated titanium nitride film of the present invention and includes a polymeric substrate and at least one titanium nitride layer characterized by microscopic uniform generally parallel surface cracking in the machine direction of the film.

It will be understood by one of ordinary skill that the specific conditions useful for the heating step will vary depending on many factors including film type, thickness, construction and the like. A suitable heating step is performed at a temperature of between 60° C. and 130° C. for a period of from 15 to 120 minutes. A preferred heating step is performed at a temperature of between 90° C. and 100° C. for a period of from 30 to 90 minutes and a particularly preferred heating step is performed at a temperature of between 90° C. and 95° C. for a period of from 45 to 60 minutes.

The heating step may be performed as a batch process such that the substantially uniform temperature environment is an enclosed oven. Alternatively, the heating step may be performed in larger installation projects as a continuous process such that the substantially uniform temperature environment is a continuous-feed oven. In most embodiments, the heating step will be followed by the step of removing the film from the substantially uniform temperature environment.

In another aspect, the present invention provides a method for applying a titanium nitride film to a transparent contoured substrate that includes the heat step described above, preferably with the removing step and prior to any film application steps. More particularly, an aspect of the present invention is a method for applying a titanium nitride film to a transparent contoured substrate that includes (i) uniformly heating the titanium nitride film to form a uniformly heat-treated titanium nitride film and (ii) heat-forming the uniformly heat-treated titanium nitride film with stepwise heat application to match the contour of the transparent contoured substrate. It will be understood that "step-wise heat application" is meant to encompass film application processes wherein heat is delivered to the film across different localized portions or areas of the film at different times, as exemplified by the '272 and '720 patents previously referenced herein. More preferably, step (i) of this method includes (a) uniformly heating the titanium nitride film in a substantially uniform temperature environment for a specified period and at a specified temperature to provide a uniformly heat-treated titanium nitride film and then (b) removing the uniformly heat-treated titanium nitride film from the substantially uniform temperature environment. The uniformly heat-treated titanium nitride film of the present method is the heat-treated titanium nitride film of the present invention and includes a polymeric substrate and at least one titanium nitride layer characterized by microscopic uniform generally parallel surface cracking in the machine direction of the film.

The following example, while provided to illustrate generally the effect of various heat treatments on titanium nitride films as well as with specificity and detail the aspects and advantages of the present invention, are not be interpreted as in any way limiting its scope. Variations, modifications and adaptations which do depart of the spirit of the present invention will be readily appreciated by one of ordinary skill in the art.

Example Step A1: Sample Preparation

Two commercially available conventional titanium nitride films were selected to test and validate the performance attributes of the heat-treated titanium nitride films of the present invention. Film A is a window film constructed with two layers of titanium nitride commercially available as HÜPER OPTIK® Ceramic 15 and an overall construction as depicted in FIG. 2. Film B is of similar construction as film A but with thinner titanium nitride layers and is commercially available as HÜPER OPTIK® Ceramic 20. Eight film blanks of (60 in by 38 in, standard windscreen size, with the longer dimension cut in the machine direction of the film) for each of the above materials were cut from larger supply rolls. One blank of each film was left untreated to function as a control sample while each of the others were uniformly heated according to one of the heat treatments described in Table 1 below using an enclosed oven with a substantially uniform temperature environment, thereby providing samples of the uniformly heat-treated film of the present invention:

TABLE 1

| Run Number | Treatment Temperature, ° C. | Treatment time, minutes |
|---|---|---|
| 1 | 90 | 30 |
| 2 | 90 | 60 |
| 3 | 90 | 120 |
| 4 | 95 | 30 |

TABLE 1-continued

| Run Number | Treatment Temperature, ° C. | Treatment time, minutes |
|---|---|---|
| 5 | 95 | 60 |
| 6 | 95 | 120 |

Each sample was removed from the enclosed oven and allowed to cool before proceeding to step B below.

Example Step B: Application of Heat-Forming Step to Samples

A heat-forming step was then performed on each sample of uniformly heat-treated film as well as the 2 control samples using step-wise heat application with a heat gun. The heat-forming step involved step-wise application of heated air at a temperature of about 300° C. for 3 minutes to sequentially selected portions of the front surface of the film from a 2000W Bosch® heat gun located about 4.5 cm from the front surface. Behind the back surface of the film was a 3 mm flat glass substrate.

Through application of heat over time in the heat-forming step, the film was visually observed via video microscopy to transition through following stages or phases:

Phase 0—applicable to control only—is used describe the initial state of the titanium nitride film prior to any heat-treating or heat forming step.

Phase 1—the titanium nitride layer of the film is characterized by microscopic generally parallel surface cracking of the film titanium nitride layer in the machine direction of the film. The uniformly heat-treated films of the present invention, because of uniform heat treatment prior to heat-forming, achieve the phase 1 stage uniformly throughout the titanium nitride layer of the film.

Phase 2—is used to describe the film as more heat is being imposed on the film and is generally characterized by formation of microscopic surface cracking approximately perpendicular to the surface cracking of Phase 1.

Phase 3—is used to describe the film in the mid stages of heat-forming step and is characterized by reduced detectability of the microscopic generally surface cracking from Phases 1 and 2 and formation of visibly identifiable white spots.

Phase 4—is used to describe the stage which at its end indicates completion the heat-forming step and is characterized by merging of the white spots formed in Phase 3.

Figure 3:
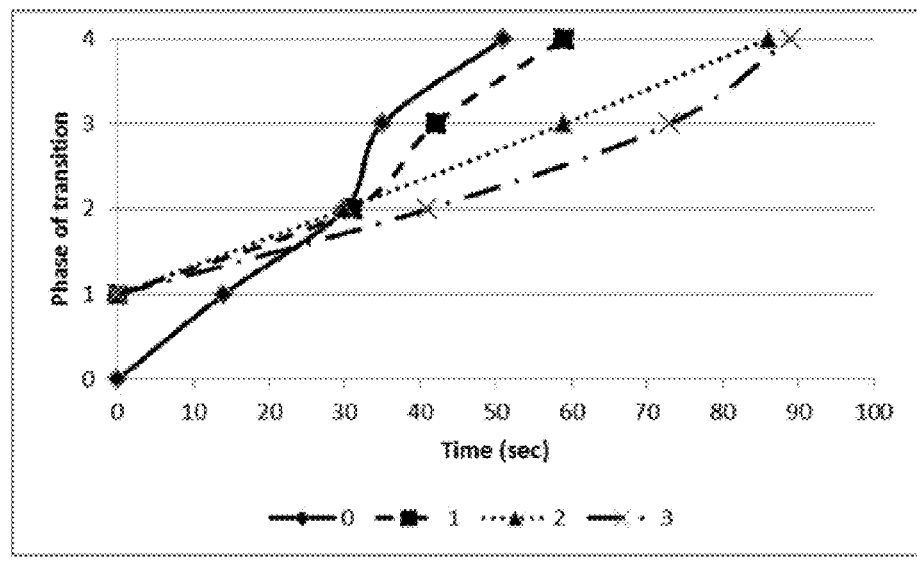
FIG. 3 a graph depicting progress of film A samples through the four transitional stages occurring during heat-forming of the film for application to a transparent substrate.
Figure 4:
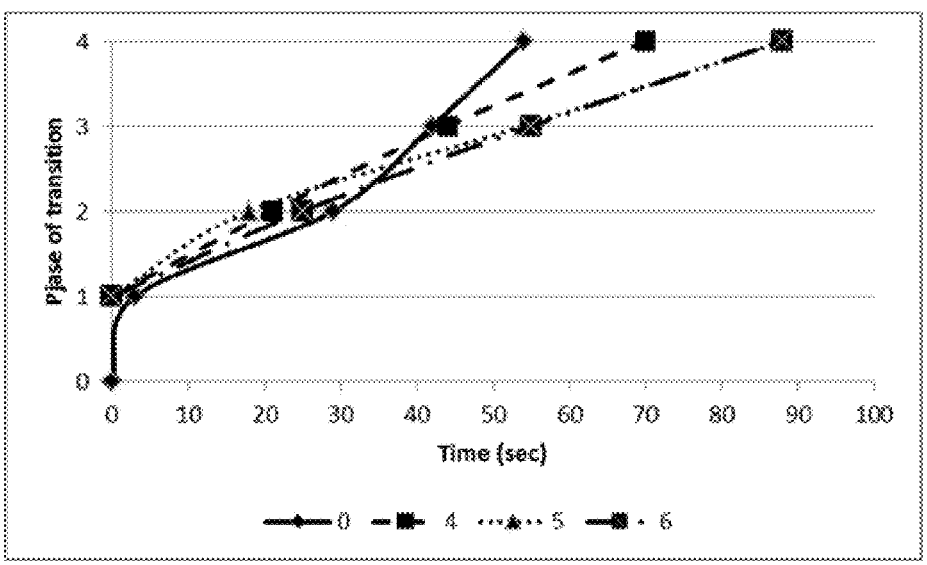
FIG. 4 is a graph depicting progress of film B samples through the four transitional stages occurring during heat-forming of the film for application to a transparent substrate.

The progress of the films through these stages is plotted graphically in FIGS. 3 and 4. By way of reference, any ghosting typically becomes evident between phases 3 and 4 while completion of the heat forming step will be achieved at the end of phase 4. It should be understood that, because the heat-forming step of the method of the present invention involves step-wise heat application, different areas of the film reach and transition through different stages at different points in the heat-forming step.

As readily evidenced by the profiles shown in FIGS. 3 and 4, a number of surprising benefits are achieved by the heat-treated films of the present invention over the controls, namely (i) the onset of phases 3 and 4 is delayed and (ii) the time buffer between stages 3 and 4 is extended. These results show that the present invention expands the time with which the film installer can observe progress through the heat-forming process and also extends the critical period through which ghosting would occur. Both results enhance the robustness of the film application process as well as its tolerance to variations in parametric variables and installer skill level and technique.

A person skilled in the art will recognize that the measurements described herein are measurements based on publicly available standards and guidelines that can be obtained by a variety of different specific test methods. The test methods described represents only one available method to obtain each of the required measurements.

The foregoing description of various embodiments of the invention has been presented for purposes of illustration and description. It is not intended to be exhaustive or to limit the invention to the precise embodiments disclosed. Numerous modifications or variations are possible in electromagnetic energy of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

That which is claimed is:

1. A method for applying a titanium nitride film to a transparent contoured substrate, said method comprising:
   i. heating said titanium nitride film in a substantially uniform temperature environment for a specified period and at a specified temperature to form a uniformly heat-treated titanium nitride film, wherein said heating step is performed at a temperature of between 60° C. and 130° C. for a period of from 15 to 120 minutes; and
   ii. applying the uniformly heat-treated titanium nitride film to the transparent contoured substrate.

2. The method of claim 1, wherein the titanium nitride film is a film blank.

3. The method of claim 1, wherein the titanium nitride film is a solar control film.

4. The method of claim 3, wherein said solar control film is a solar control window film and said contoured transparent substrate is a window.

5. The method of claim 1, wherein said heating step is performed at a temperature of between 90° C. and 100° C. for a period of from 30 to 90 minutes.

6. The method of claim 1, wherein said heating step is performed at a temperature of between 90° C. and 95° C. for a period of from 45 to 60 minutes.

7. The method of claim 1, wherein said substantially uniform temperature environment is an enclosed oven.

8. The method of claim 1, wherein the substantially uniform temperature environment is a continuous feed oven.

9. The method of claim 1, wherein the temperature of said substantially uniform temperature environment for said heating step is substantially constant over said period for said heating step.

* * * * *